United States Patent
Reynen et al.

[11] Patent Number: 6,155,914
[45] Date of Patent: Dec. 5, 2000

[54] APPARATUS FOR THE APPLICATION OF AN ADVANCED TEXTURE PROCESS

[75] Inventors: Frank Richard Reynen, Cupertino; Simon Wing Tat Fung, Fremont; Eric Steck Freeman, Oakland; Andu Alem Tefera, San Jose, all of Calif.

[73] Assignee: Seagate Technologies, LLC, Scotts Valley, Calif.

[21] Appl. No.: 09/156,331

[22] Filed: Sep. 18, 1998

Related U.S. Application Data

[60] Provisional application No. 60/059,438, Sep. 22, 1997.

[51] Int. Cl.⁷ ...................................... B24B 7/00
[52] U.S. Cl. ........................ 451/168; 451/173; 451/63; 451/303; 451/302; 451/296; 451/307
[58] Field of Search .................................. 451/168, 173, 451/63, 303, 302, 296, 307

[56] References Cited

U.S. PATENT DOCUMENTS

| | | | |
|---|---|---|---|
| 3,481,083 | 12/1969 | David et al. | 451/63 |
| 4,617,763 | 10/1986 | Edling | 451/303 |
| 4,839,994 | 6/1989 | Heesemann | 451/6 |
| 4,854,084 | 8/1989 | Sparacca et al. | 451/303 |
| 4,930,259 | 6/1990 | Kobylenski et al. | 451/168 |
| 4,973,496 | 11/1990 | Kruger et al. | 427/129 |
| 5,016,400 | 5/1991 | Weber | 451/303 |
| 5,367,866 | 11/1994 | Phillips | 451/303 |
| 5,628,676 | 5/1997 | Hoshizaki | 451/168 |
| 5,885,143 | 3/1999 | Ichikawa et al. | 451/168 |
| 5,913,712 | 6/1999 | Molinar | 451/41 |

OTHER PUBLICATIONS

"EDC 1800A Automated Surface Finisher", Nov. 11, 1994, Exclusive Design Company, Inc., EDC 1800A ASF Manuel, Part No. 15633, pp. 1–1 through 1–9.

*Primary Examiner*—David A. Scherbel
*Assistant Examiner*—Shantese McDonald
*Attorney, Agent, or Firm*—LaRiviere, Grubman & Payne, LLP

[57] ABSTRACT

Apparatus for removing random scratches formed during the polishing of magnetic recording media, and for disposing on the surface of the media a near-circumferential texture which increases the recording reliability of the media while simultaneously reducing its failure rate. The present invention teaches the application of a low unit load force to a pad and polishing tape combination in contact with a rotating and oscillating disk surface to completely remove the random scratches previously formed by a polishing step. The apparatus facilitates the application of a specially designed, extremely fine alumina slurry composition without producing similar size circumferential scratches at the high surface speeds. The apparatus provides for a smoother disk surface heretofore available, the surface being significantly more uniform than known batch process apparatus for polishing and texturing disks, leading to increased recording reliability, and increased efficiency of manufacturing through reduced manufacturing and post-deployment failures.

19 Claims, 3 Drawing Sheets

APPARATUS FOR THE APPLICATION OF AN ADVANCED TEXTURE PROCESS

CROSS-REFERENCE TO RELATED APPLICATIONS

This application claims benefit, under 35 U.S.C. 119(e)(1), of the earlier filing date provided by Provisional Application No. 60/059,438, filed Sept. 22, 1997.

This application is also related to Patent Application entitled: "ADVANCED MECHANICAL TEXTURE PROCESS FOR HIGH DENSITY MAGNETIC RECORDING" by the same applicants, being filed concurrently herewith.

TECHNICAL FIELD

The present invention relates to the manufacture of high density recording thin film media where extreme low glide application is needed for reliable recording and playback capability. More particularly, the present invention teaches a novel process for polishing and texturing the recording disks of hard-drive adapters which results in heretofore unattainable degrees of surface smoothness. More particularly still, the process taught in the present invention is a steady-state texturing and polishing methodology, resulting in significantly decreased failure of the disks and increased manufacturing efficiency.

BACKGROUND

From the very first, the magnetic recording industry has constantly and dramatically increased the performance and capacity of hard disk drives to meet the computer industry's insatiable demand for more and better storage. Not so long ago, a 40 MB disk drive was a big deal. Today it's a door stop, and a 1 GB drive is a minimum for most desktop computers. Applications like multi-media, real-time video and audio, and graphical user interfaces, along with ever-increasing program sizes, are driving the need for ever-increasing storage capacity.

To meet these needs, the magnetic recording industry has been increasing the areal density storage capacity of hard drives at a historical rate of roughly 27 percent per year. In recent years, the growth rate itself has increased to as much as 60 percent per year with the result that today's disk drives store information in the 600 to 700 Mb per square inch range. By the year 2000 the areal density requirements are expected to reach 10 Gb per square inch. Sustaining this growth rate into the next century requires progressive advances in all technologies used to fabricate hard disk drives.

The read-write head technology that has sustained the hard disk drive industry to date is based on the inductive voltage produced when the a permanent magnet (i.e. the disc) moves past a wire-wrapped magnetic core (i.e., the head). Early recording heads were fabricated by wrapping wire around a laminated iron core analogous to the horseshoe-shaped electromagnets found in elementary school physics classes.

Market acceptance of hard drives, coupled with increasing areal density requirements, fueled a steady progression of inductive recording heading advances. This progression culminated in advanced thin-film inductive read-write heads that are fabricated using semiconductor-style processes in volumes large enough to meet the insatiable demands of the computer industry for data storage. Even though advances in inductive read-write head technology have been able to keep pace with increasing areal density requirements, the ability to cost-effectively manufacture these heads is nearing its natural limit, hence a new recording head technology, the magneto-resistive (MR) head is currently being implemented to fuel the disk drive industry's continued growth in capacity and performance.

The magneto-resistive head not only increases the areal density of a given disk drive but enables the more rapid retrieval of data therefrom. One of the reasons for this is that the MR head is flown at a substantially lower distance from the disk surface than previous inductive read-write heads. This "flying height" has been steadily decreasing as recording technology advances. Currently the flying height of most read-write heads is measured in millionths of an inch. The new magneto-resistive head technology enables flying height's measured in Angstroms. Given this extremely small separation between the read-write head and the disk surface, it will be appreciated that even the previously acceptable microscopic faults in disk surface texture now present a source for catastrophic failure.

Current manufacturing practice is to use a randomly super-polished substrate, and after polishing, the recording surfaces of each disc are individually textured with a near circumferential pattern over the previously super-polished area, bringing the area to a desired roughness, or texture. This texturing is performed as a single or double texture step on texture machine. One such machine is an EDC-1800 (Exclusive Design Co., Inc., San Jose, Calif. This process presents several problems.

A first problem is that the scratches formed by the random polishing are not reliably and completely removed from the recording surface after the texture has been applied to the polished disk. Instead, the texture is superimposed on the random scratches, which results in a relatively uneven surface. This in turn forms a disk surface from which all recorded signals cannot be reliably retrieved for reliable playback. In the worst case, the unevenness formed by this methodology allows protrusions above the disk surface which will destroy a magneto-resistive head flying in close proximity thereto.

A second problem is that current polishing methodologies utilize a polishing pad which is used to produce disks in a batch process. In this batch-oriented methodology, a previously specified number of disks are sequentially polished using the same pad surface. This causes an uneven wear state the polishing pad with a concomitant uneven distribution of the polishing material disposed on the polishing pad. This in turn leads inevitably to uneven roughness and scratch counts on the surface of the disk so formed, with all the previously discussed problems.

What is clearly needed is a methodology which provides for a smoother disk surface than the current super-polish/texture methodology. The key problem to this former methodology is clearly the unwanted interaction between the random super-polish scratches overlaid by near-circumferential texturing scratches. In other words, what is needed is methodology which either obviates or completely eliminates the random super-polish scratches.

What is further needed is a methodology which is inherently more uniform than the current batch process for polishing and texturing disks, leading to increased efficiency of manufacturing through reduced manufacturing and post-deployment failures.

It would be further desirable if the methodology could be implemented without completely re-engineering or replacing existing polishing and texturing equipment.

DISCLOSURE OF THE INVENTION

The present invention teaches an oscillating circumferential polishing methodology using alumina slurry in a mechanical polishing process prior to the texture process. As used herein, the terms "circumferential" and "near circumferential" are substantially interchangeable and refer to substantially circular, or arcuate, processes and artifacts, which are curved, or arcuate, and are either perfectly parallel, or very nearly so. The near circumferential process, taught by the present invention, removes all the random polish scratches as an integral part of the texture process itself. The alumina slurry-charged polishing tape, of the present invention is advanced through the process area at a relative constant speed, and is maintained at a low, but constant load force contact with the disk. This means that every square centimeter of every disk so produced is exposed to the same polishing tape wear and slurry disposition. Accordingly, the present invention presents the novel advantage, over conventional polishing techniques, of a "steady state" polishing/texturing methodology.

In contrast to prior art randomly polished surfaces, the near-circumferentially polished disk surface produced by the present invention leaves no random scratches remaining on the disk surface. From this it follows that the texture step produces a more uniform texture on the recording surface, thereby minimizing drive failure while simultaneously improving the read/write reliability of the disk itself.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawing taken in conjunction with the following detailed description of the Best Mode of Carrying Out the Invention. In the drawings.

Figure 1:
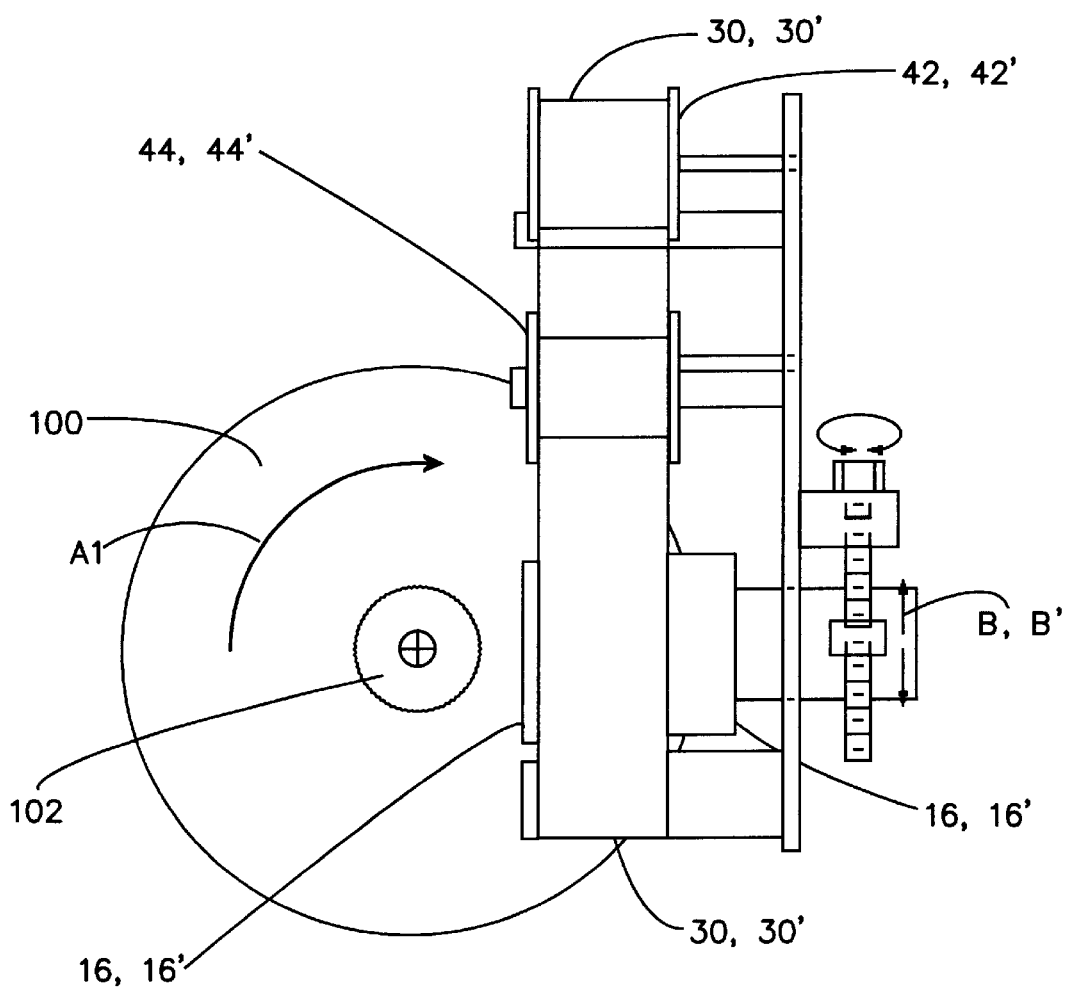
FIG. 1 is a front schematic view showing the present invention.

Reference numbers refer to the same or equivalent parts of the invention throughout the several figures of the drawing.

BEST MODE OF CARRYING OUT THE INVENTION

This invention has an advantage in that the polishing tape is in direct contact with the disk surface as it advances through the process area at a relative constant speed and every disk is exposed to the same amount of tape wear increasing the disk to disk surface uniformity substantially over the old polish process.

A principle feature of the present invention is the application of a low unit load force to a pad and tape combination in contact with the disk surface. The disk surface moves in a circumferential direction to completely remove the random scratches previously formed by a polishing step. The tape applies a specially designed, extremely fine alumina slurry composition, without producing similar size circumferential scratches at the high surface speeds.

Referring now to FIG. 1 the methodology of the present invention is explained. A disk, 100, is mounted, utilizing a clamp, 102, or similar device on an apparatus, not shown, for rotating the disk about its axis in a circumferential manner as indicated by arrow A1. One such apparatus is a polishing or texturing machine, for instance an Exclusive Design Corporation EDC—1800, not shown. In a first preferred embodiment of the present invention, the speed of rotation in the direction A1 as shown is preferably from 300 to 500 rpm.

The succeeding discussion presupposes a disk having two recording surfaces and from the principles disclosed herein, it will be obvious to those having ordinary skill in the art, that the present invention may, optionally, be utilized on recording media having only a single recording surface. In general, this will be achieved by implementing only one of the paired polishing apparatus, hereinafter discussed.

Figure 2:
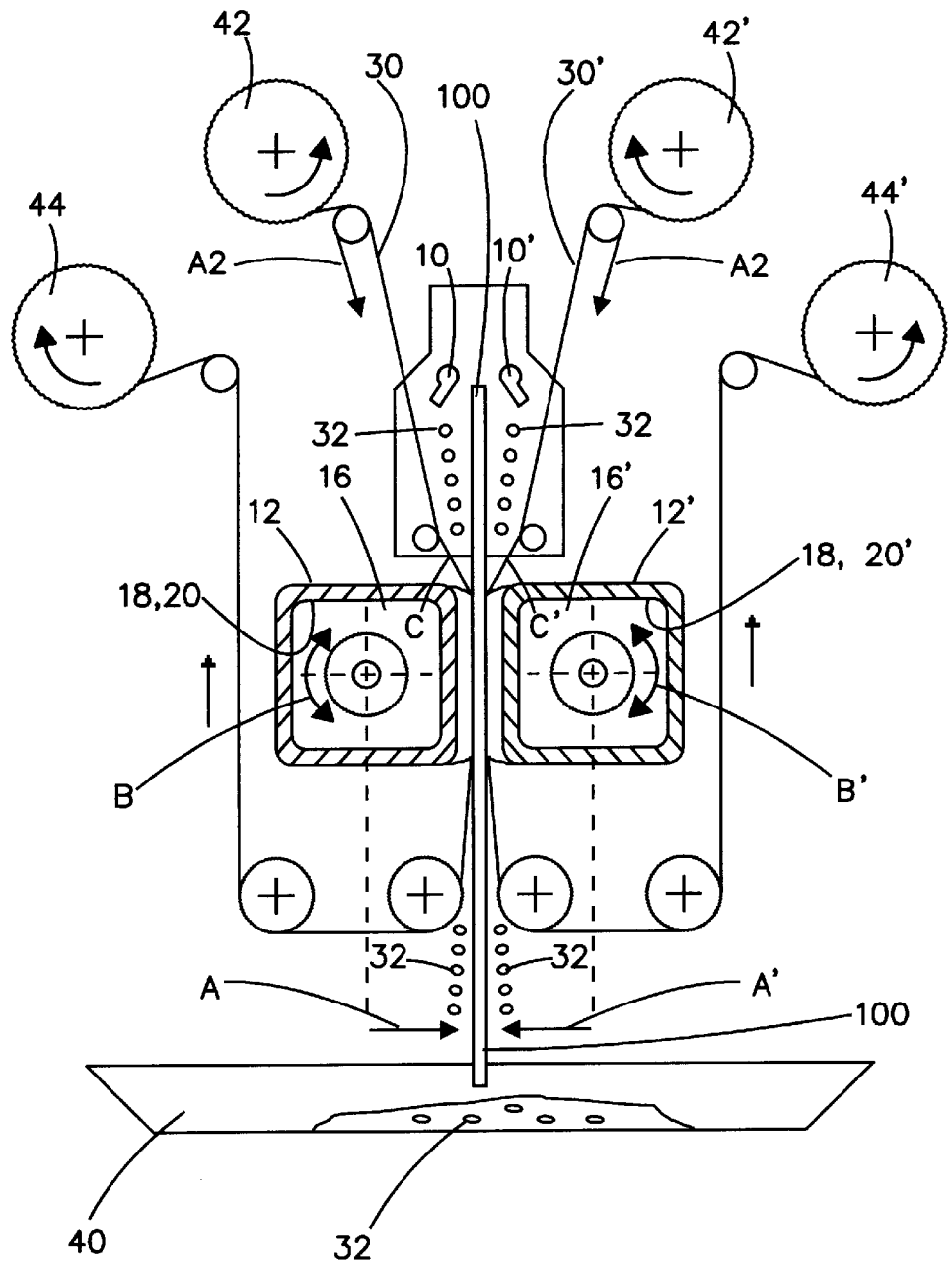
FIG. 2 is a side schematic view showing the polishing tape transport of the present invention.

In the preferred methodology taught herein and as shown in FIG. 2, the present invention utilizes a pair of opposing polish head assemblies, 16 and 16', which urge a pair of abrasive-laden polish or applicator pads, 12 and 12', towards disk 100 as it rotates. In a preferred embodiment of the present invention, the effective polish area comprises a maximum area measuring 47 mm by 47 mm, and a minimum effective polish area of 6 mm by 47 mm.

Polish heads 16 and 16' include polish blocks 18 and 18'. Polish heads 16 and 16' have at least one flat surface each for carrying and urging applicator pads 12 and 12' towards disk 100. In this embodiment of the present invention, polish heads 16 and 16' are substantially cubic structures which can rotate as shown by arrows B and B' to facilitate alignment with the disk surface. A layer of polish pad backing, 20 and 20' is applied to the surface of polish blocks 18 and 18' respectively. In a first preferred embodiment of the present invention polish pad backing 20 and 20' is Rodel Politex (Regular), available from Rodel, Inc., Newark, Del.

Polish head assemblies 16 and 16' are urged inwardly as shown by arrows A and A' by applying a low load force. In a first preferred embodiment of the present invention, this load force is preferably in the range of 1.8 kg to 2.7 kg per head assembly. This load force may be established and maintained by means of a weight, spring, pneumatic cylinder, hydraulic cylinder, hydro-pneumatic cylinder, or other urging means well-known to those having ordinary skill in the art.

Figure 3:
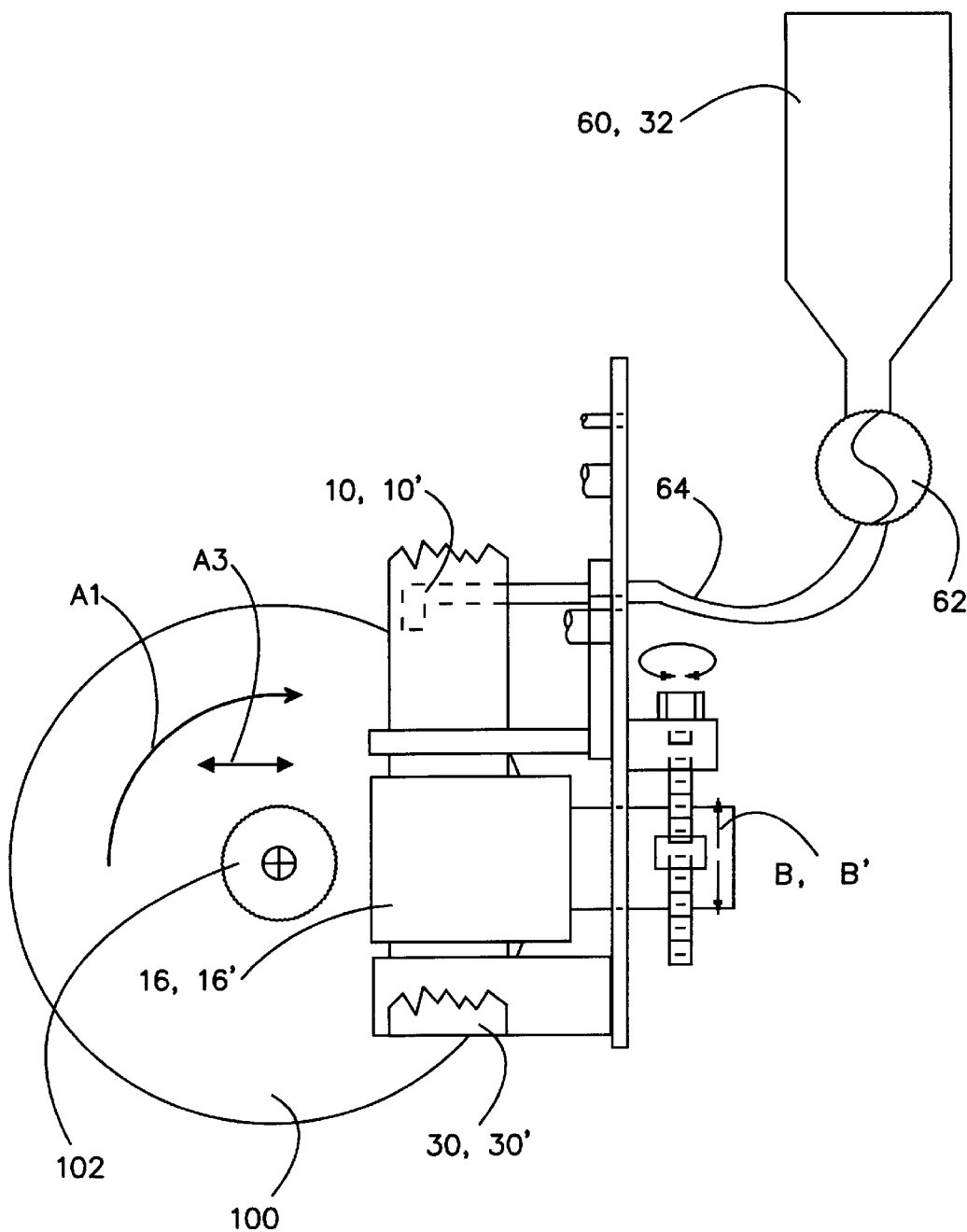
FIG. 3 is a front schematic view showing application of slurry and disk oscillation taught by the present invention.

As disk 100 rotates as indicated by arrow A1, applicator pads 12 and 12' are urged in the direction A, A', shown. While polishing tape 30 and 30' is fed at a tape feed rate in the range of 5 to 25.4 mm per minute. In a first preferred embodiment of the present invention, tape 30 and 30' take the form of polyurethane open cell tape having a polyester backing. As tape 30 and 30' are fed, as indicated by arrows A2, towards polish head assemblies 16 and 16' they are charged with a stream of polishing slurry 32 and 32' respectively from slurry nozzles 10 and 10'. The slurryladen applicator pads and tape are then urged and fed into contact with disk 100 at region C and C', as previously discussed. In this manner, the application of a low unit load force, applied as indicated by arrows A and A', to a relatively large pad and tape combination in contact with the disk surface moving in an oscillatoory direction A3 as shown in FIG. 3, completely removes any previously formed random scratches.

While a number of polishing slurries, or indeed other polishing compounds, may be utilized to perform the principles of the present invention, a first preferred embodiment of the present invention utilizes an aqueous solution of alumina grit with a screen size of from 0.15 microns to 0.30 microns. The composition of the slurry in this first preferred embodiment is from 50 to 250 grams of alumina per liter of solvent.

A tape storage and transfer mechanism may be utilized to store new polish tape material and to retrieve used polish tape material, and to guide the polish tape material through the apparatus previously discussed. A receptacle, 40, may be provided to receive excess and spent polishing slurry 32.

Referring now to FIG. 2, a side view of a mechanism capable of performing the methodology taught by the present invention is shown. In this view are shown tape supply, 42 and 42', and take up, magazines 44 and 44', used for storing used polishing tape 30 and 30'. Also shown in this view is the mechanism for maintaining polish head assemblies 16 and 16' in a parallel relationship with the surface of disk 100.

As shown in FIG. 3, the principles of the present invention further contemplate storing a quantity of slurry 32 in a container, 60, and delivering the slurry to slurry nozzles 10, 10' by means of piping 64 and a slurry delivery mechanism 62. The slurry delivery mechanism may be a pump, gravity feed, or other fluid or semi-fluid delivery methodology well-known to those having ordinary skill in the art.

In operation, a disk 100 is mounted by means of clamp 102 then slurry nozzle 10, 10' deposits slurry 32, 32' into the wedge region C, C'(shown in FIG. 2) created between the surface of disk 100 and polishing tape 30, 30'. Disk 100 is then rotated in the direction shown at A1 and a flow of slurry 32, 32' is continued from a container 60 through slurry transport mechanism 62 and piping 64 to slurry nozzle 10, 10'. The previously discussed inward load force is continuously applied to polish blocks 16' and 16, and the polishing tape motion, discussed and shown in FIG. 2 continues. Thereafter, an oscillatory motion A3 is imparted to disk 100 by means of a cam and slide mechanism. This oscillatory motion is in the oscillatory range of from 1.5 mm to 3 mm. The frequency of the oscillation is preferably between 1 and 4 Hz. In this manner, a near-circumferential texturing is applied by the simultaneous rotation and oscillation of the disk in contact with the polishing tape. A process time of from 20 to 60 seconds is generally sufficient to impart the desired near-circumferential texture, while completely removing any random polishing scratches left by a previous polishing step.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, it will be obvious to those of ordinary skill in the art that the implementation of the principles of the present invention may be practiced with alternate equipment not specifically discussed herein. The principles of the present invention specifically contemplate all such implementations and combinations. Finally, while the term "circumferential" has been used throughout, it will be apparent to those of ordinary skill in the art that this usage is general, and specifically contemplates a number of geometries wherein any polishing scratches are either parallel to one another or nearly so. The invention disclosed herein may be practiced without any element which is not specifically disclosed herein.

What is claimed is:

1. An apparatus for removing random polishing scratches from a magnetic recording medium, the medium having at least one surface and an axis, the apparatus comprising:
    a spindle for rotating the medium about its axis; and
    means for circumferentially polishing the surface of the medium while rotating on the spindle, comprising
        a length of polishing tape,
        means for charging the polishing tape with a polishing material;
        means for applying a low unit load force to said polishing tape, thereby urging the polishing tape against the surface of the medium, comprising
            an adjustable block, the block defining a planar cushioning block surface and an axis,
            rotational mounting means for aligning the cushioning block surface coplanar with the surface of the medium,
            urging means for urging the block into contact with the polishing tape and for applying the low unit load force to the tape, the tape being positioned and fed between the cushioning block surface and the surface of the medium, and
        means for continuously feeding the tape, charged with the polishing material onto and past the medium.

2. The apparatus of claim 1 wherein the means for charging the polishing tape with a polishing material further comprises means for continuously charging the polishing tape with the polishing material.

3. The apparatus of claim 2 wherein the medium is rotated about its axis at a rate of between about 300 and about 500 rpm.

4. The apparatus of claim 2 wherein the polishing material further comprises an aqueous slurry of powdered alumina.

5. The apparatus of claim 4 wherein the aqueous slurry of powdered alumina further comprises powdered alumina having a screen size of from about 0.15 microns to about 0.30 microns in concentrations from about 50 to about 250 grams alumina per liter of aqueous solvent.

6. The apparatus of claim 1 further comprising means for oscillating the spindle rotating the medium while simultaneously charging the polishing tape with the polishing material and feeding the tape.

7. The apparatus of claim 6 wherein the spindle is oscillated at an oscillatory frequency between about 1.0 and about 4.0 Hz.

8. The apparatus of claim 6 wherein the means for continuously feeding the polishing tape further comprises means for continuously feeding the tape at a rate between about 5 mm per minute and about 25 mm per minute.

9. The apparatus of claim 1 wherein the polishing tape further comprises a length of polyester-backed polyurethane open-cell polishing tape.

10. The apparatus of claim 1 wherein the urging means is selected from the group consisting of: screw pressure; weight; spring; pneumatic cylinder; hydraulic cylinder; and hydro-pneumatic cylinder.

11. The apparatus of claim 1 wherein the cushioning block surface comprises a pad.

12. The apparatus of claim 11 wherein the pad, in operative combination with the polishing tape, defines an effective polishing area.

13. The apparatus of claim 12 wherein the polishing area comprises dimensions not exceeding about 47 mm by about 47 mm in the circumferential direction of the polishing process to a minimum dimension of not less than about 47 mm by about 6 mm in the circumferential direction of the polishing process.

14. The apparatus of claim 1 further comprising means for programming the apparatus for a specified process time.

15. The apparatus of claim 14 program med for a process time of from about 20 to about 60 seconds.

16. The apparatus of claim 1 wherein the low unit load force is in the range of from about 1.8 kilograms per block to about 2.7 kilograms per block.

17. An apparatus for removing random polishing scratches from a rigid magnetic recording medium, the medium having at least one surface and an axis, the apparatus comprising:

a spindle for rotating the medium about its axis in a circumferential direction;

a movable length of polishing tape;

an adjustable block, the block defining a cushioning surface and a pad backing, means for positioning at least a portion of the length of the polishing tape between the surface of the medium and the cushioning surface;

a container containing an aqueous slurry of powdered alumina for being applied to at least a portion of the length of the polishing tape, the alumina having a mean size of from about 0.15 microns to about 0.30 microns, the aqueous slurry of alumina being provided in concentrations from about 50 to about 250 grams of alumina per liter of aqueous solvent;

means for applying a unit load force from 1.8 kilograms to 2.7 kilograms to the block;

transport means for feeding at least a portion of the polishing tape, charged with the aqueous slurry of powdered alumina, onto and past at least a portion of the surface of the medium, in a manner substantially co-planar with the surface of the medium at a rate between about 5 mm per minute and about 26 mm per minute; and means for oscillating the spindle parallel to the surface of the medium, whereby the random scratches are completely removed from the surface of the medium without producing similar size circumferential scratches.

18. The apparatus of claim 17 wherein the cushioning surface, in operative combination with the polishing tape, defines an effective polishing area comprises dimensions not exceeding about 47 mm by about 47 mm in the circumferential direction of the polishing process to a minimum dimension of not less than about 47 mm by about 6 mm in the circumferential direction of the polishing process.

19. An apparatus for removing random polishing scratches from a magnetic recording medium, the medium having at least one surface and an axis, the apparatus comprising:

a spindle for rotating the medium about its axis;

a length of polishing tape;

means for charging the polishing tape with a polishing material;

means for applying a force to the polishing tape in the range of about 1.8 kilograms to about 2.7 kilograms, thereby urging the polishing tape against the surface of the medium; and means for continuously feeding the tape, charged with the polishing material onto and past the medium.

* * * * *